US006778078B1

(12) United States Patent
Han et al.

(10) Patent No.: US 6,778,078 B1
(45) Date of Patent: Aug. 17, 2004

(54) INTEGRATED EMERGENCY SIGNALING LOAD MANAGEMENT SYSTEM

(75) Inventors: Wei-Jer Han, Alsip, IL (US); Robert Spangler, Jr., Pittsburgh, PA (US)

(73) Assignee: Federal Signal Corporation, Oakbrook, IL (US)

( * ) Notice: Subject to any disclaimer, the term of this patent is extended or adjusted under 35 U.S.C. 154(b) by 0 days.

(21) Appl. No.: 09/429,908

(22) Filed: Oct. 29, 1999

(51) Int. Cl.$^7$ ................................................. G08B 3/10
(52) U.S. Cl. ................. 340/474; 340/472; 340/384.4; 340/384.5; 340/384.7
(58) Field of Search ................. 340/438, 455, 340/472, 474, 463, 384.1, 384.4, 384.5, 384.7; 307/10.7

(56) References Cited

U.S. PATENT DOCUMENTS

| | | | |
|---|---|---|---|
| 4,902,956 A | * | 2/1990 | Sloan ......................... 307/10.7 |
| 5,296,840 A | | 3/1994 | Gieffers ....................... 340/474 |
| 5,557,257 A | * | 9/1996 | Gieffers ....................... 340/474 |
| 5,659,289 A | * | 8/1997 | Zonkoski et al. ............ 340/438 |
| 5,831,515 A | * | 11/1998 | Stewart et al. ............ 340/384.4 |
| 6,037,676 A | * | 3/2000 | Foree .......................... 307/10.7 |
| 6,100,791 A | * | 8/2000 | Bader et al. ................. 340/331 |
| 6,421,593 B1 | * | 7/2002 | Kempen et al. .............. 701/48 |

OTHER PUBLICATIONS

Product Information of Kussmaul Electronics, 1$^{st}$ page, Table of Contents, and pp. 45–51 on "Load Manager Products."

Kussmaul Electronics Company, "Load Manager" product information (2 pages) from website printed Oct. 15, 1999.

IPS product information (2 pages) printed Oct. 15, 1999 from website on "A Complete Front–Line Patrol Car on a Circuit Board."

* cited by examiner

Primary Examiner—Toan N. Pham
(74) Attorney, Agent, or Firm—Leydig, Voit & Mayer, Ltd.

(57) ABSTRACT

An emergency signaling system with integrated load management functionality is provided wherein the load management circuitry is alternatively operable in programming and operating modes. The system includes a keypad, control head, control unit and a plurality of signaling features selectively activated by the control unit in the operating mode. The load management circuitry automatically sheds loads from the signaling system in response to an indication from the electrical system powering the signaling system that an energy drain is occurring at the energy source that will cause disruption to other more important systems—e.g., the ignition system in a vehicle.

13 Claims, 9 Drawing Sheets

*MAIN MENU*

*PROGRAM MODE ENABLED*

PROGRAM LOAD SHEDDING SEQUENCE

PROGRAM VOLTAGE THRESHOLDS

INTEGRATED EMERGENCY SIGNALING LOAD MANAGEMENT SYSTEM

TECHNICAL FIELD OF THE INVENTION AND CROSS REFERENCE TO RELATED PATENT

The invention relates to the load management of accessories for emergency vehicles such as police cars, fire engines, ambulances and the like.

In the following description of the load management system of the invention, an exemplary emergency signaling system is described as part of the illustrated embodiment of the invention. This emergency signaling system is more completely described in U.S. Pat. No. 5,296,840, which is assigned to the same assignee as the present invention. U.S. Pat. No. 5,296,840 (hereinafter "the '840 patent") is incorporated herein by reference.

The reader should appreciate, however, that the invention is applicable to any accessory system of a vehicle. Those familiar with the products of the assignee Federal Signal Corporation will recognize the exemplary emergency signaling device described herein and described in the '840 patent to be Federal Signal's SS2000 Smart Siren® system. The load management system of the invention has been implemented in circuitry and software that is an extension of the hardware and software in the existing SS2000 product. Thus, in some instances particular aspects of the implementation of the invention described herein have been primarily determined by the desire to not change the architecture of the existing product. As a result, a unique communication format was designed to provide data transfer between battery electrical load sensing and microcontroller operation.

BACKGROUND

There exist programmable signaling mechanisms, such as the Smart Siren® system marketed by Federal Signal Corporation, and disclosed in U.S. Pat. No. 5,296,840. The Smart Siren® system allows a user to selectively program desired signaling features, such as various lights and sirens, to activate in each of a number of user selectable modes. For instance, a user may use the Smart Siren® system keypad to program the vehicle's flashing lights to activate in a first mode, whereas in a second mode, additional lights are activated and in a third mode a siren is activated. In the Smart Siren®, a slide switch is provided to allow the user to quickly switch between modes. In addition to programming the desired signaling in each mode, the nature of the siren tone is also programmable through the same input keypad. For example, the siren tone may be programmed to be a yelp, wail, or air horn sound. Because of this programmability, this system has greatly reduced the workload on operators of emergency vehicles.

It is also known to provide a load shedding device to manage electrical loads in a vehicle. Existing load shedding devices may be placed in a vehicle and appropriately configured via dip switches or otherwise to provide a desired load shedding function. For example, such a device may measure vehicle battery voltage, and sequentially disable electrical loads, such as various lights, until the vehicle charging system is able to meet the electrical demands of the vehicle.

Users of emergency vehicles may desire to have both a smart signaling system such as the Smart Siren® and load shedding functionality on one vehicle. In such cases, the user has traditionally had to install two separate systems and user inputs. For example, a dash-mounted console is installed to operate the Smart Siren® system, while an additional dash-mounted console is required for the load manager. In addition, the load manager relay board must also be installed in the vehicle. These two systems are completely independent, must operate independently, and are independently programmed. This creates difficulties for users in that programming of both systems takes more time and is more complex due to the necessity of interacting with multiple user inputs. In addition, redundancy of parts, functions, and wiring in the two systems causes the price of such separate systems to be prohibitive for many applications. Also, the overall reliability and performance of such a system is compromised due to the complex wiring schemes involved in the installation.

An emergency signaling device is needed whereby the load managed enabling and disabling of external functionality, such as lights, and the provision of specific signal content, such as siren tone, are provided centrally through a consistent interface in a user-friendly and cost-effective manner.

SUMMARY OF THE INVENTION

The present invention solves the problems associated with the prior art by providing an integrated programmable siren control system and programmable load management system for use in emergency vehicles, wherein the integrated system may operate in either a programming or operating mode. The integrated system includes a control head with keypad, and a control unit. In the operating mode, portions of the keypad are usable to selectively enable various signaling devices.

The load management feature automatically causes the shedding of electrical loads in a pre-programmed sequential manner when it detects that the vehicle battery voltage is lower than certain threshold levels, and that the vehicle is in a PARK condition. This ensures that more critical electrical systems, such as vehicle engine ignition and radio functionality, remain uncompromised. The integrated functions are programmable from a centralized location readily accessible to the vehicle operator, avoiding the need to control functions from separate locations through separate user inputs.

In addition to managing these relay outputs, the load manager also controls the fast idle of the vehicle in low-battery situations as an initial attempt to prevent draining of the battery by the loads of the emergency system. Loads are shed in response to a low-battery-voltage condition if the fast idle condition does not stop the deterioration of the battery voltage. An audible beep may be generated each time a load is turned off. All previously shed loads will be restored at 0.5 seconds interval with reversed sequence as they were shed when the vehicle shifts out of PARK.

Battery voltages above the reference point will not restore previously shed loads. Only after the PARK has been released and engaged again will the load manager be reset. This portion of the load manager for a specific load can also be turned off through programming to prevent load shedding under certain operational conditions.

As soon as the vehicle shifts out of PARK, the HIGH IDLE output will be turned off immediately. HIGH IDLE will also be turned off if the battery voltage returns to a user-programmable point above the reference voltage (e.g. 13.8V).

Other objects and advantages will become apparent upon reference to the following detailed description when taken in conjunction with the drawings.

While the invention will be described in connection with a preferred embodiment, there is no intent to limit it to those embodiments. On the contrary, the intent is to cover all alternatives, modifications, and equivalents falling within the spirit and scope of the invention as defined by the appended claims.

DETAILED DESCRIPTION OF THE PREFERRED EMBODIMENT

Figure 1:
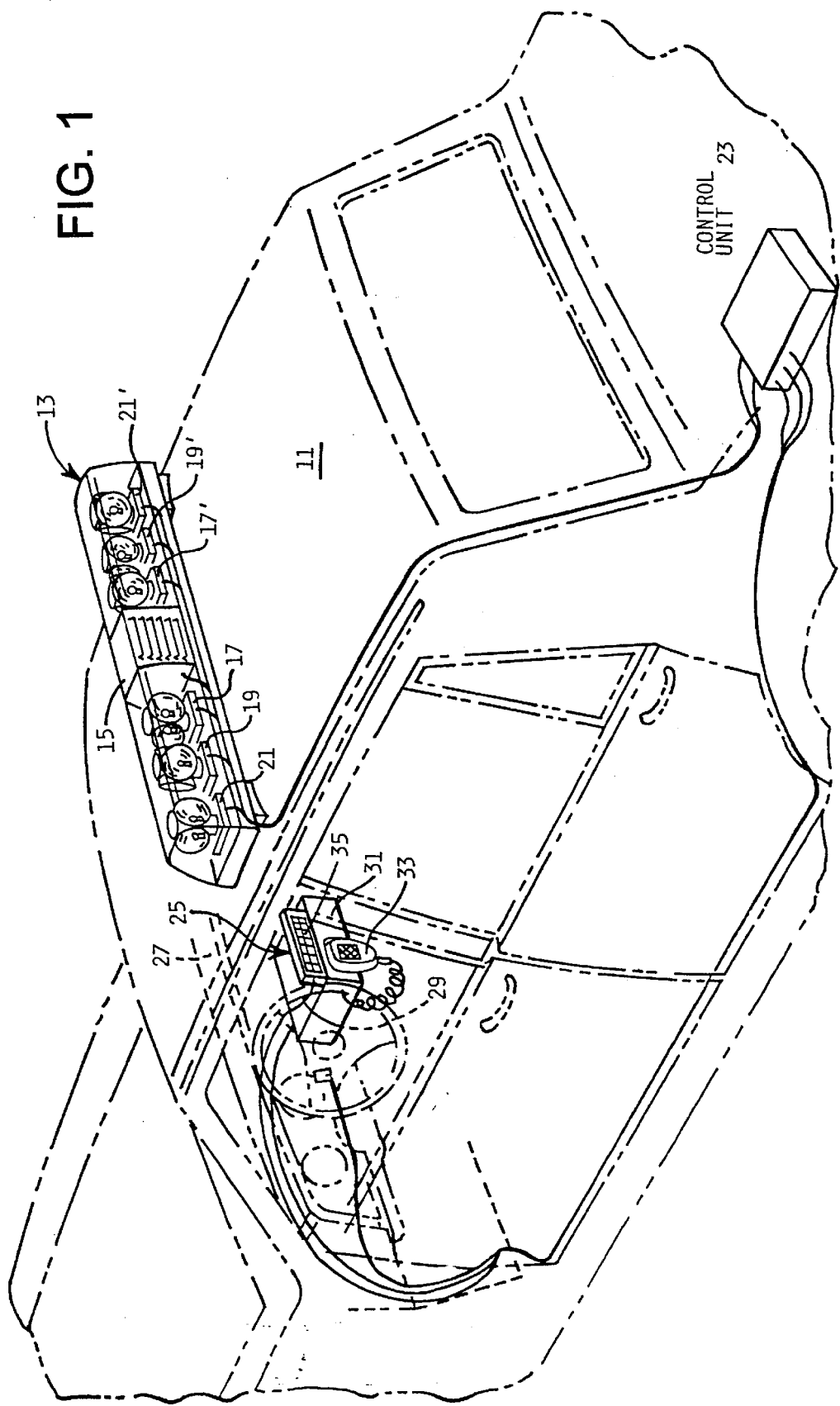
FIG. 1 is an elevated perspective view of an emergency vehicle incorporating a signaling/load management system according to the invention, where the standard vehicle construction is shown in broken lines in order to highlight the system.

Those familiar with emergency signaling systems for vehicles will appreciate that such systems create a substantial load on the electrical system of a vehicle such as the vehicle 11 illustrated in FIG. 1. The signaling/load management system described herein and shown in FIGS. 1–7 includes signaling devices which are illustrative only and intended merely to aid in explaining how the system manages loads placed on the electrical system of the vehicle 11 when the vehicle is operating under emergency conditions. More important to the invention is the cooperative operation and load management of the lights and siren of the emergency signaling devices on the vehicle by a single-processor system whose operational and load shedding characteristics are independently programmable from a single convenient location, as will be discussed.

Thus, the reference in this description to particular loads comprising emergency signals is not intended to limit the scope of the invention to the illustrated or similar systems. To the contrary, the invention is applicable to all systems that are intended to provide a comprehensive emergency signaling system for a vehicle.

In the following detailed description, the signaling system is described in general terms to provide a context for the description of the load management function. A complete detailed description of the emergency signaling functions can be found in the '840 patent.

The exemplary signaling system illustrated in FIG. 1 is installed in a vehicle 11 shown in broken lines. The system includes a conventional light bar 13 that incorporates a speaker 15 and a plurality of lights. In such a light bar, the lights are typically arranged in three groups—i.e., flashing lights, rotator lights and other lights such as take-down and alley lights. In the illustrated light bar, two pairs of three (3) lights are arranged on both sides of the centrally located speaker 15. Although actual light bar configurations of the system including flashing lights, rotators and beacons may be different than that illustrated, for convenience of reference and illustration, the inner light 17 or 17' of each pair is considered herein to be a rotator, the central light 19 or 19' is considered to be a flasher and the outer light 21 or 21' is considered to be a beacon.

Control of the groups of lights 17–21, 17'–21' and the speaker 15 comprising the light bar 13 is provided by a control unit 23 and control head 25. The control head 25 is mounted in the interior area of the vehicle 11, preferably on the dashboard/instrument panel area 27 just to the right of the steering wheel 29 for easy access by the operator of the vehicle. Typically associated with the control head 25 is a two-way radio 31. As is well known with respect to these types of signaling systems, the control unit 23 may rebroadcast radio signals over the speaker 15, and a microphone 33 of the two-way radio may function as a microphone for a public address (PA) function implemented by the speaker 15. Activation of either of these features is accomplished by way of keystrokes to a keypad 35 incorporated in the control head 25.

The emergency signaling system may include other switches activated manually, or by the horn, and so on. Signals from these switches are received by the control unit 23, which responds by controlling the operation of the light bar 13 and siren/speaker 15 in a predetermined manner.

Figure 2A:
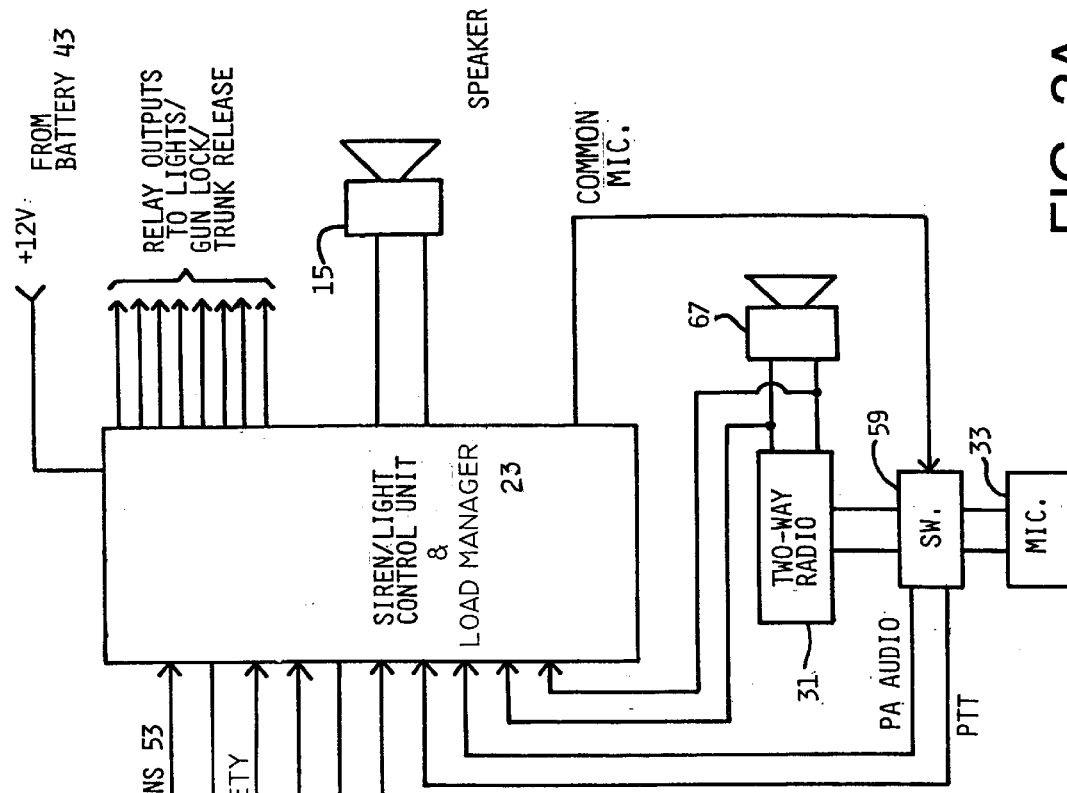
FIG. 2A is a schematic diagram of the signaling/load management system of FIG. 1, illustrating the load management function incorporated into a control unit that is programmable by way of a control head preferably mounted at a location convenient to a driver of the vehicle shown in FIG. 1.
Figure 2B:
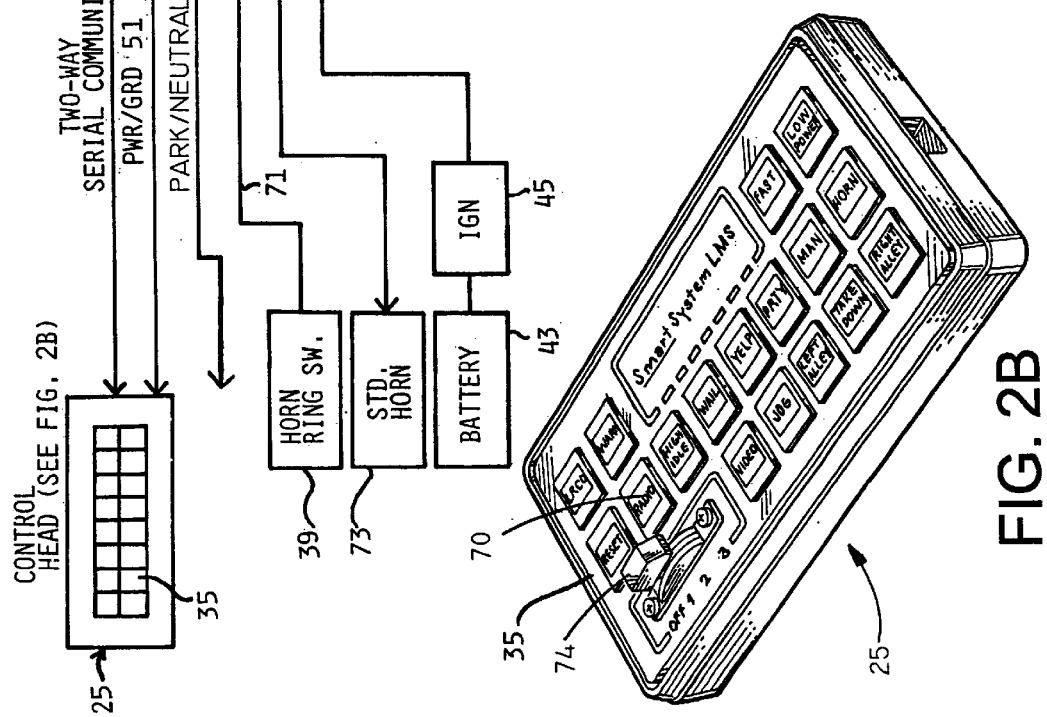
FIG. 2B is a perspective view of the control head of the signaling/load management system including a keypad for programming and operating the system in keeping with the invention.

Referring to FIGS. 2A and 2B, the control unit 23 of FIG. 1 receives power from a battery 43 of the vehicle by way of an ignition circuit 45 in a conventional manner. Because of the power requirements of the lights 17–21, 17'–21' of the light bar 13 of FIG. 1, they receive power from the battery 43 through a separate circuit that includes relays 119, which are associated with the control unit 23 as illustrated in more detail in FIG. 3B.

The control unit 23 is programmable by way of the keypad 35 of the control head 25 to provide a mechanism for modifying the manner in which the system manages its load on the vehicle's electrical system. Selected keystrokes to the keypad 35 place the control unit 23 into a programming mode wherein the load shedding characteristics of the system may be changed. In an installed system, the shedding function is tailored by first causing the control unit 23 to enter a program mode by way of keystrokes to the keypad 35 and then programming either or both of the load shedding sequence and the threshold voltages for the load management function, as will be described hereinafter.

Before describing the programming of the system in further detail, the operation of the system's load management function is described. For ease of understanding, the following description of the operation of the signaling/load management system is undertaken from the frame of reference of an operator. In other words, the operation will be described with respect to system responses to keystrokes to the keypad 35.

Referring to the illustration of the control head 25 in FIG. 2B, when a slide switch 74 is in its "OFF" position, the control unit 23 assumes an idle mode condition, meaning the system is not operating the lights and speaker. Moving the slide switch 74 on the control head 25 to one of the positions marked "1", "2" or "3" transfers the system from this idle mode to one of the operating modes. In an operating mode, the system may activate either the lights or the speaker or both. Also, a keystroke to the "RADIO" key 70 will transfer the system to a radio-rebroadcast mode. A second keystroke to any of these keys will return the system to the mode identified by the slide switch 74. Referring to FIG. 2A, communications between the control head 25 and the control unit 23 is by way of hardwired serial communications lines 53, one for transmitting and a second for receiving.

As mentioned, placing the slide switch 74 into any one of the positions "1", "2" and "3" places the system into one of its signaling operating modes. Each of these operating modes is intended for particular types of emergency situations. Typically, the operating modes are configured to provide a range of signaling intensity. For example, operating mode 1 may provide low intensity signaling such as flashes only and no siren. Operating mode 2 may activate a more intense signaling configuration such as the simultaneous operation of the flashing lights and rotators. Operating mode 3 may activate the most intense signaling configuration, one that is usually used for pursuing a vehicle and similar extreme emergency situations. In operating mode 3, the system may be configured to simultaneously operate the flashing lights 17, 17', the rotators 19, 19, the beacons 21, 21' and the speaker 15. The siren tone generated in operating mode 3 may be either a wail, yelp or high/low sound. Sounds in each of the modes are programmable via control head 25 as described in the '840 patent.

Certain keys of the keypad 35 control auxiliary functions that may be activated in any of the operating modes or also in the "OFF" position of the slide switch 74. Examples of auxiliary functions for these keys are as follows: "LEFT ALLEY" light 21; "RIGHT ALLEY" light 21'; and "TAKE-DOWN" light 21'. A keystroke to any of these keys will activate the associated auxiliary function.

Figure 3A:
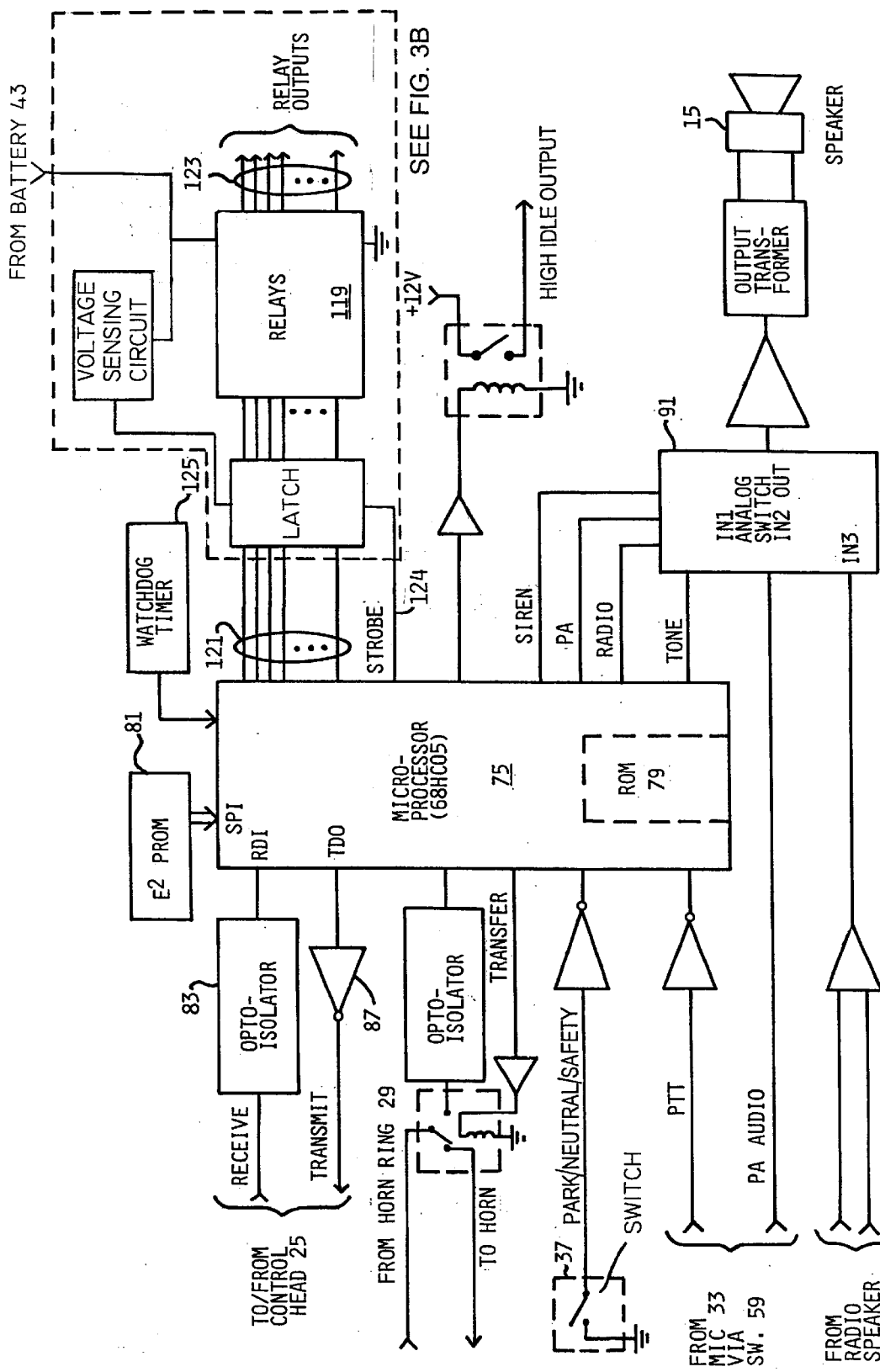
FIG. 3A is a schematic diagram of the control unit for the signaling/load management system of the invention, which illustrates the voltage sensing circuitry that measures battery voltage and provides the measurement to a microprocessor of the control unit for the purpose of managing the emergency loads placed on the power system of the vehicle.

Each of the control circuit 23 and the control head 25 of the signaling/load management system includes a microprocessor, preferably the MC68HC05C9, manufactured by Motorola, Inc. of Austin, Tex. The microprocessor 75 of the control unit 23 is illustrated in FIG. 3A. It and the microprocessor 77 of the control head 25 (FIG. 4) are in a conventional master/slave configuration, where the microprocessor 75 of the control unit 23 is nominally the master. The program executed by the control unit's microprocessor 75 is stored in a ROM 79 internal to the microprocessor 75. The programming of the signaling system is stored in an EPROM 81 that is connected to the SPI input of the microprocessor in a well-known manner. A listing of the program stored in the ROM 79 for controlling the emergency lights is contained in Appendix A of the '840 patent. On the receive input (RDI) of each microprocessor 75 and 77, an opto-isolator circuit 83 and 85, respectively, protects the receive inputs by isolating them from the noise of the power and ground of the system. The transmit output (TDO) of each microprocessor 75 and 77 is associated with a buffer/inverting amplifier 87 and 89, respectively.

One of three sources of audio signals may be provided to the speaker 15 via an analog switch 91 in response to control signals from the microprocessor 75. The first source is one of the tone signals (i.e., peak-and-hold, yelp, wail, high/low, air horn) generated by the microprocessor 75 when the system is in operating mode 3 or when the appropriate one of the auxiliary functions is selected. The second source of audio signals for the speaker 15 is the microphone 33 for execution of the PA function. The third source is the output of the two-way radio 31 for execution of the radio rebroadcast function. The analog switch 91 is a commercially available device such as MC 14066B switch/multiplexer, manufactured by Motorola of Phoenix, Ariz. The particular audio source presented to the speaker 15 is determined by selective activation by the microprocessor 75 of the three control lines "SIREN", "PA" or "RADIO." In response to an active control line, one of the audio signals is passed from the inputs of the analog switch 91 to its output labeled "OUT."

The bank of relays 119 of the control unit 23 is responsive to control signals generated on control lines 121 by the microprocessor 75 in response to keystrokes to the keypad 35 of the control head 25 and signals on the PARK/NEUTRAL/SAFETY line. Power to the relays 119 is provided directly from the battery 43 of the vehicle 11 in order to provide the needed power to the devices attached to the outputs 123 of the relays. The bank of relays 119 includes a latch and driver for each relay as described more fully in connection with FIG. 3B. The control signals are strobed into the latch by way of a "STROBE" signal 124 from the microprocessor 75.

The outputs 123 of the relays 119 provide selective power to the lights 17–21 and 17'–21' of the light bar 13. The outputs may also control conventional gun lock and/or trunk release mechanisms. The control lines 121 are under program control and each of the control lines can be programmed in the program mode for tailoring various operating modes of the loads connected to the lines. Each control line is associated with a power circuit controlled by one of the relays 119. One of the control lines 121 for example, may energize one of the relays 119 that completes the power circuit for the flashing lights 17 and 17'. Another one of the control lines 121 may energize one of the relays 119 that completes the power circuit for the rotators 19 and 19'. Another one of the control lines 121 may energize one of the relays 119 that completes the power circuit for the lights 21 and 21'.

Figure 3B:
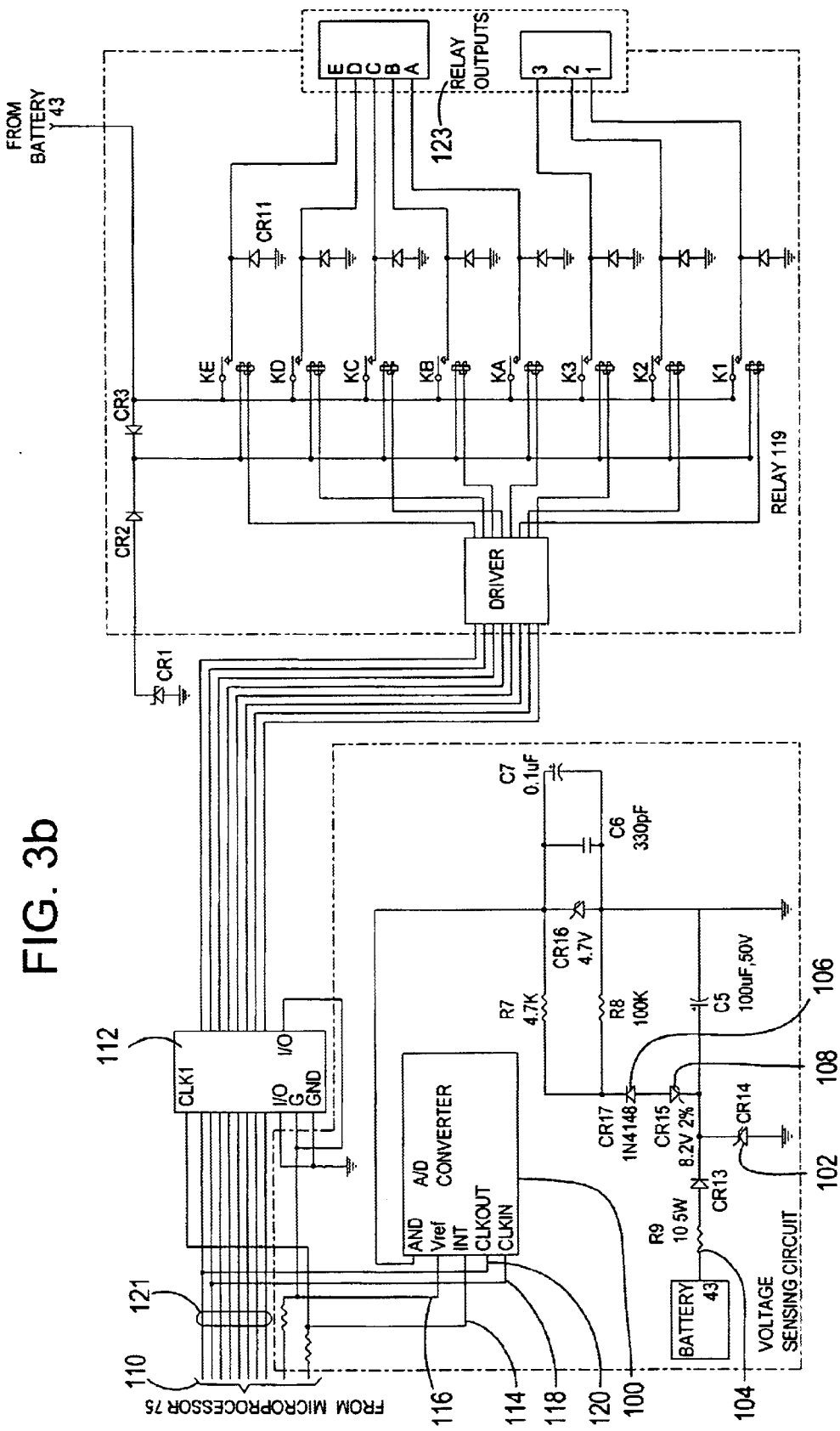
FIG. 3B is a circuit diagram of the load management circuitry that is schematically illustrated in FIG. 3A.

Referring to FIG. 3B, in order to monitor the voltage at the battery 43, an analog to digital converter (ADC) circuit 100 provides a digital signal to the microprocessor 75. A zener diode 102 ensures that the voltage introduced to the measurement system is no more than its breakdown voltage, here about 27V. Diodes 104 and 106 provide a voltage drop of 1.4V taken together, while diode 108 provides a voltage drop of 8.2V. Thus, the battery voltage variations of interest, which cover the range of approximately 10 to 15 Volts, are mapped to a range of approximately 0 to 5 volts, an appropriate range matching the ADC input range of 0 to 5 volts. Temperature compensation is fortuitously accomplished by the pairing of diodes 106 and 108, by virtue of the fact that temperature-induced variations in the performance of one diode will be offset by a similar change in the other, which is oriented with an opposite polarity.

A microcontroller 100 includes analog-to-digital conversion functionality and communicates with the main microprocessor 75 via a data bus 110 for controlling the relays. A programmable logic device (PLD) 112 serves as a latch for capturing control signals from the microprocessor 75 and for isolating the data bus so that battery voltage data from the ADC microcontroller 100 is not passed downstream to the relays 119. The data bus 110 is multiplexed with signals that control the relays 119 and signals that describe the voltage at the battery 43, briefly as follows: Microcontroller 100 takes control of bus 110 pursuant to a simulated "request to send" signal on line 114 to the interrupt input of microcontroller 100, which also connects to the clock input of PLD 112. The relay enablement data is latched to the right of PLD 112 by the rising edge of this signal, while the microcontroller 100 routine is triggered by the falling edge. Microcontroller 100 asserts a low value (CheckBit) on line 116 to control the bus 110 and disable the gate signal (G) of the PLD 112. Lines 118 and 120 are then used to signal and send the actual digitized voltage data while microcontroller 100 controls the bus.

The generation of emergency sounds and other real-time signal processing on the data bus takes priority over communicating the battery voltage back to the microprocessor 75. Moreover, the time required for the microprocessor 75 to communicate with peripherals should be as short as possible. The data bus 110 to the relays 119 operates in a parallel mode, which makes the time between successive signals to the relays relatively short compared to the time needed for a serial communication.

Noise level is controlled through several approaches. The power ground including relay coil is separated from signal ground. There are two significant considerations in splitting them. One consideration is the electrical current and the other consideration is coil inductance. The inductance (L) plus PCB inherent capacitance (C) forms resonant circuitry induces signal oscillations in some specific frequencies. This noise interferes with the lights, relays and communication bus lines. Separate ground lines solve the problem.

Figure 4:
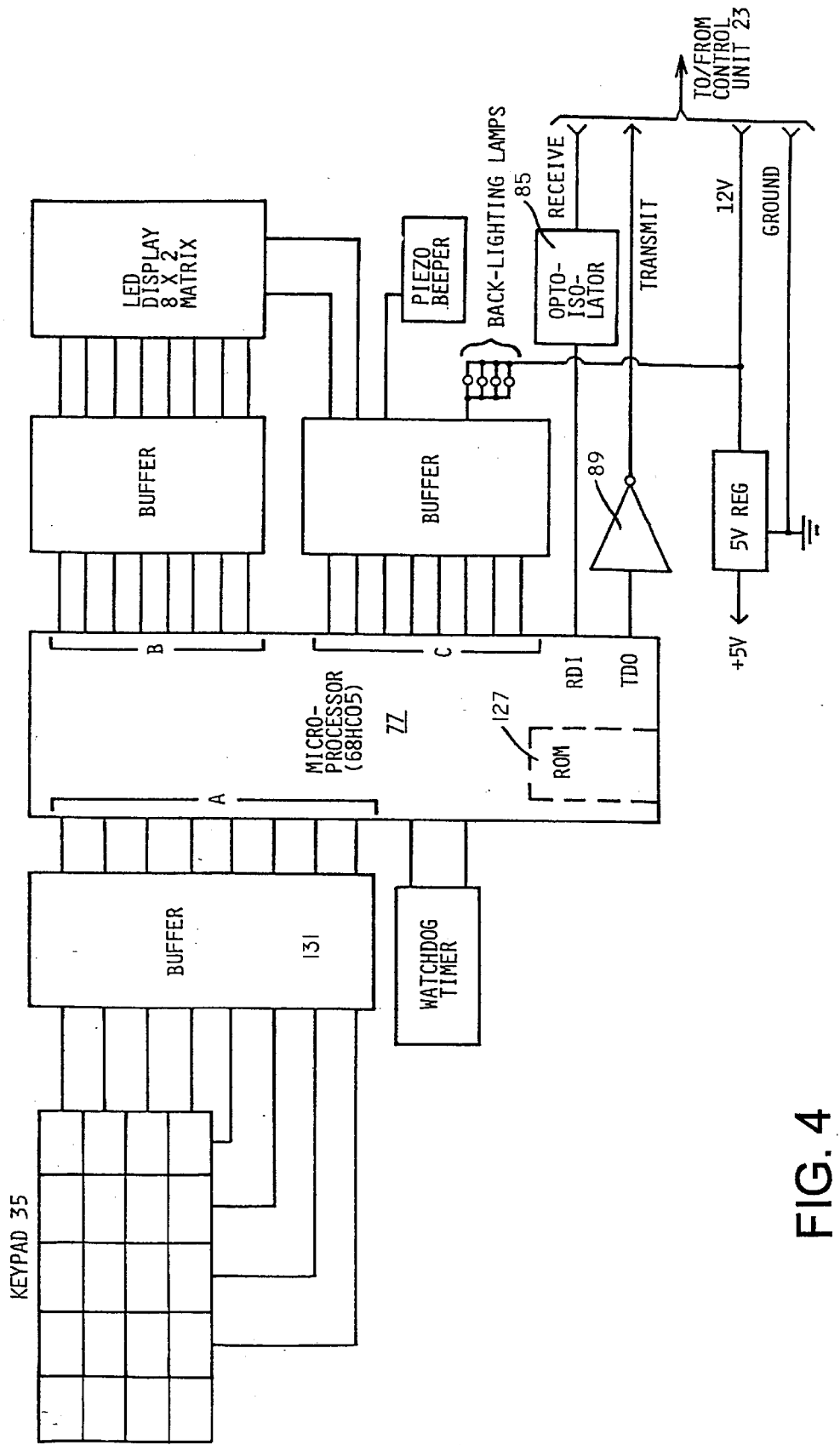
FIG. 4 is a schematic diagram of the circuitry comprising the control head of the signaling/load management system.

The slave microprocessor 77 of the control head 25 executes a program stored in a ROM 127 internal to the microprocessor as shown in FIG. 4. Input ports "A" to the microprocessor 77 receive keystroke signals from the keypad 35. The keypad 35 is laid out as a four-by-four matrix that is buffered by a conventional buffer 131 such as a 74LS240 manufactured by Texas Instruments, Dallas, Tex. The microprocessor 77 identifies keystrokes to the keypad 35 and transmits the information to the microprocessor 75 from its TDO output. The functioning of keypad 35 is described in greater detail in the '840 patent which has been incorporated by reference.

In the following paragraphs, the operating and programming of the load manager of the invention is described. As mentioned, a more detailed description of the operating and programming of the signaling system is found in the aforementioned '840 patent, which has been incorporated herein by reference.

In the operating mode, in order to facilitate the operation of the load management system, an interrupt routine is periodically executed by the microprocessor 75. In a conventional manner, the microprocessor 75 responds to a timer based interrupt request to service a software-based routine stored in the ROM 79. A flow-chart describing this routine appears in FIG. 5. Initially, in step 1, the routine determines whether the vehicle is in PARK. If it is not, then a check is made for previously shed loads, which are turned back on in reverse order preferably with a short delay, such a as 0.5 seconds, between them, and the routine is exited. If the vehicle is in PARK, then in step 2 it is determined whether the battery voltage has been less than 12.8 volts for more than 30 seconds. If no, the routine branches to point c2, to be discussed below. If yes, a check is made in step 3 whether high idle has been turned on. If it has, then a load is shed according to the programmed sequence, and if the low voltage alarm is on, the routine is exited. If the alarm is not on, the routine branches to node c4. If high idle was not on in step 3, then it is turned on and the routine branches to node c4.

In step 4, it is determined whether the battery voltage has been less than 11.8V for 30 seconds or more. If yes, the low voltage alarm is turned on. At this point, at node c1 and c2, the voltage is checked in step 5, and if it is found to be greater than 12.8V for 30 seconds or more, then the low voltage alarm, if on, is turned off. If it is not found to be greater than 12.8V for 30 seconds or more, then status flags are updated and the routine exited. In step 6, if the battery voltage is found to be greater than 13.8V for 30 seconds or more, then the high idle, if on, is turned off. If it is not found to be greater than 13.8V for 30 seconds or more, then status flags are updated and the routine exited.

Note that the load shedding sequence can be overridden or reversed manually by pushing a key on keypad 35 associated with a particular load. Thus, in addition to the steps shown in FIG. 5, the load shedding routine checks for such manual indications. If a manual indication is received which corresponds to a potentially or previously shed load, that load is not shed, or, if previously shed, is restored, regardless of the programmed load shedding sequence. Additionally, the high idle and low voltage alarm functions may also be overridden manually in a similar manner.

Figure 5:
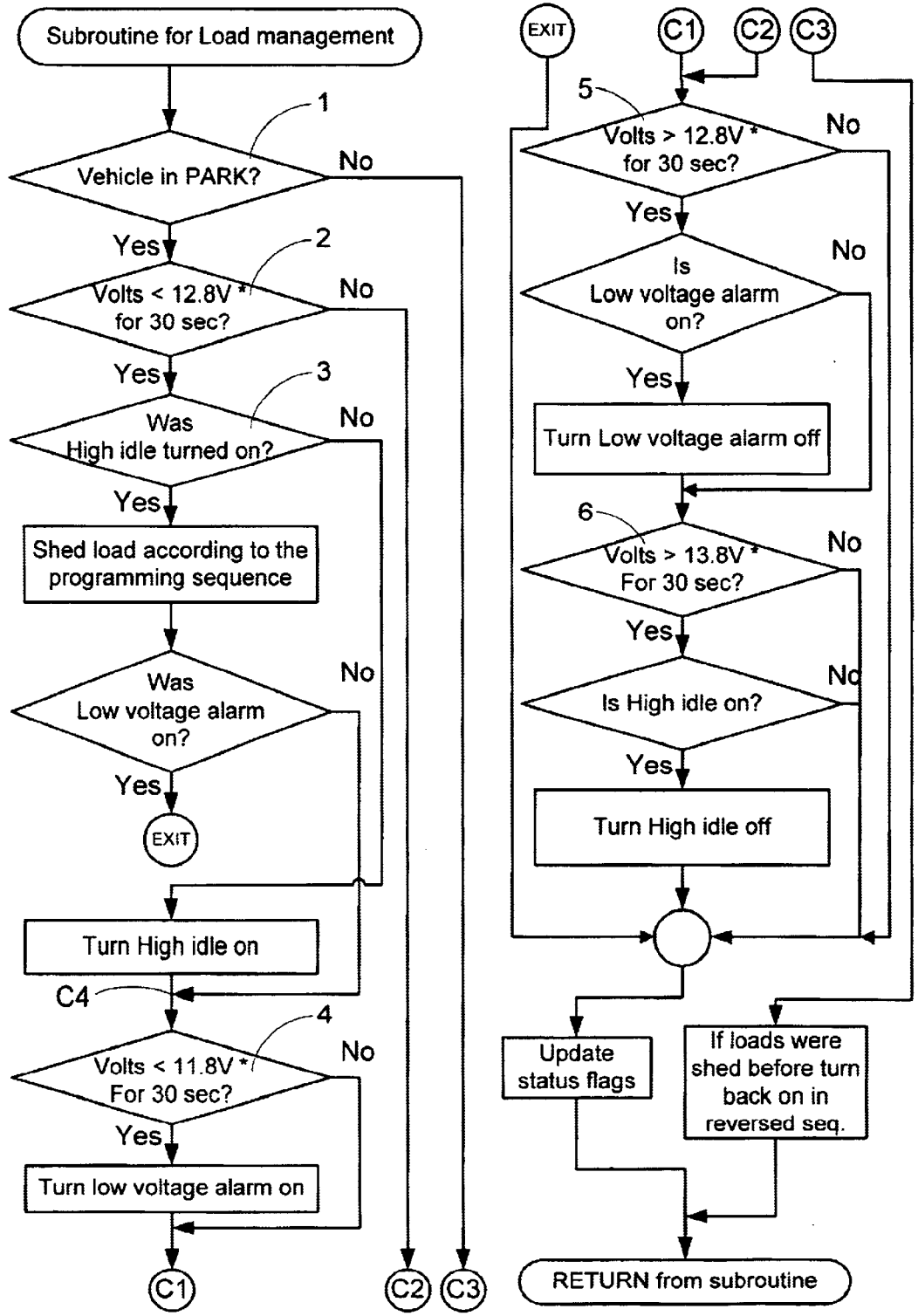
FIG. 5 is a flow diagram of a program executed by the microcontroller of the control unit in response to an interrupt request generated by the load management circuitry for shedding loads in response to low voltage at the vehicle's battery.

In addition to the monitoring activity shown in FIG. 5, it is also preferable to monitor the voltage of the vehicle's battery during non-emergency driving, such as when the vehicle is not in PARK, and the siren is not on. The control processor 23 of FIG. 2A has access to the information regarding the gear that the vehicle is in through the PARK/NEUTRAL/SAFETY line, and is also aware of the status of the siren since enablement of the siren is through the control processor 23. Thus, if the sensed battery voltage while the vehicle is being driven and the siren is off falls below a preset threshold, the audible low voltage alarm is sounded. This allows the driver of the vehicle to manually remove electrical loads, and/or to cease operation of the vehicle in a safe manner, being forewarned. Numerous conditions could cause such a situation, including alternator failure, various wiring failures, and so on.

The programming mode of the control head 25 is preferably entered via selected actions or keystrokes by the user. Once in the programming mode, the control head 25 may appear as shown in FIG. 7A.

Figure 6:
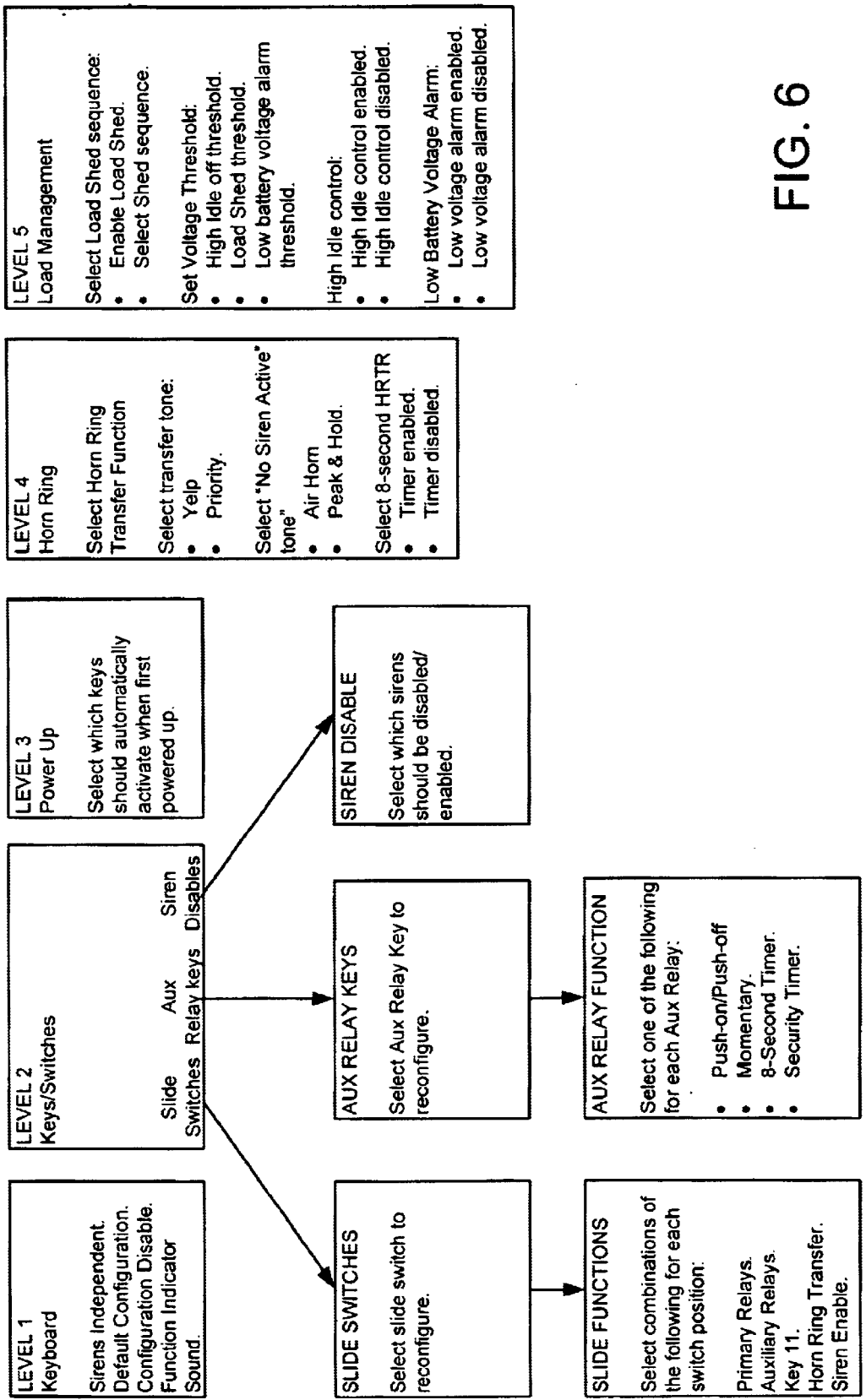
FIG. 6 is a map relating the several programming modes of the signaling/load management system, including the mode for programming the load management function.
Figure 7A:
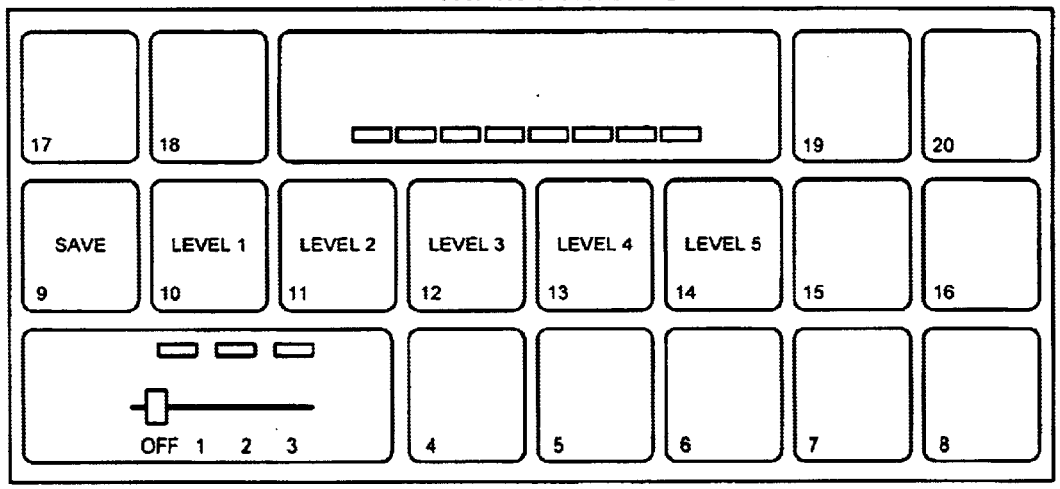
FIGS. 7A, 7B, 7C and 7D are four images of the panel of the control head illustrating a sequence of keystrokes that serve to program the load management circuitry so that its load shedding function can be tailored to the vehicle.

There are five program levels indicated by keys 10, 11, 12, 13 and 14 as shown in FIG. 7A. The configuration tree corresponding to these levels is shown in FIG. 6. Programming the emergency loads for normal operation according to levels 1–4 is described in detail in the '840 patent. Essentially, the first four levels enable the programming of the functionality and/or default condition of the keyboard, keys, and switches, as well as the parameters of the Horn Ring function. The Programming Level 5 exposes the load management functionality of the system. As shown, many parameters and functions related to load management can be accessed and adjusted from this programming level.

The configuration mode of the system may be entered by simply executing the following steps:
1. Power up the system and wait for startup to finish.
2. Unplug the control head 25.
3. Press SAVE (key 9) and continue to hold.
4. Plug the control head 25 back in while continuing to hold SAVE.

5. Release the SAVE key. The "MAIN MENU" shown in FIG. 7A will come up on the keyboard as soon the configuration mode is entered. Keys 10, 11, 12, 13, and 14 are preferably solidly illuminated at this juncture. From the menu, there are six choices:

Key 9—SAVE
Key 10—ENTER PROGRAMMING LEVEL 1
Key 11—ENTER PROGRAMMING LEVEL 2
Key 12—ENTER PROGRAMMING LEVEL 3
Key 13—ENTER PROGRAMMING LEVEL 4
Key 14—ENTER PROGRAMMING LEVEL 5

Pressing "SAVE" (Key 9) will save the present configuration to permanent memory, end the programming session, and put the system into operation mode. In the current embodiment, the Slide Switch is preferably left in the OFF position while reconfiguring the system.

From the MAIN MENU, a keystroke to key 14 places the system into the fifth programming level, which is the programming mode for the load manager as discussed above. In order to inform the user that the system is in the programming mode for the load manager, the keys 10, 11, 15 and 16 are illuminated as shown in FIG. 7B.

Figure 7B:
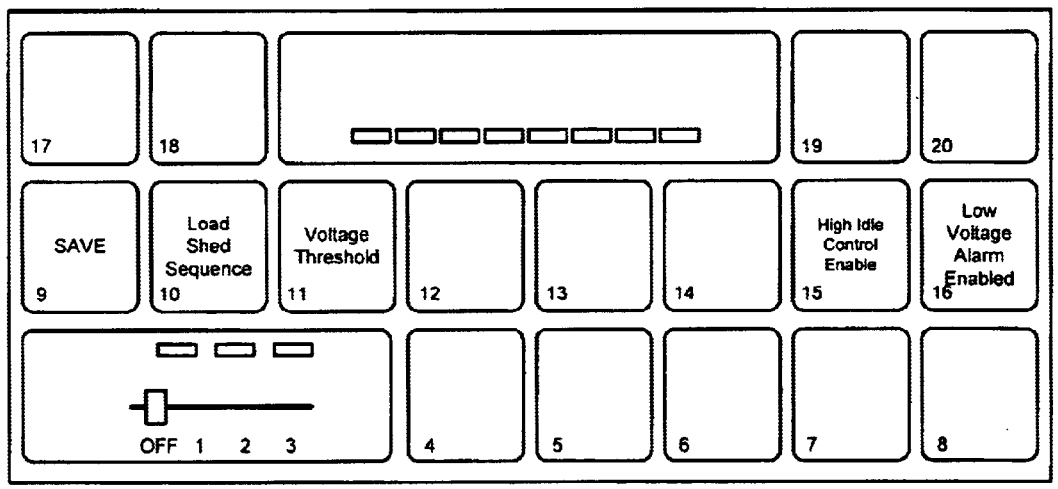

Keystrokes to each of the four illuminated keys 10, 11, 15 and 16 in FIG. 7B will display the shed sequence, voltage threshold, high idle control, and low alarm control, respectively. Programming of each of these is as follows:

A keystroke to key 10 arms the control head 25 for programming the shed sequence. The control head 25 should appear as shown in FIG. 7C.

Figure 7C:
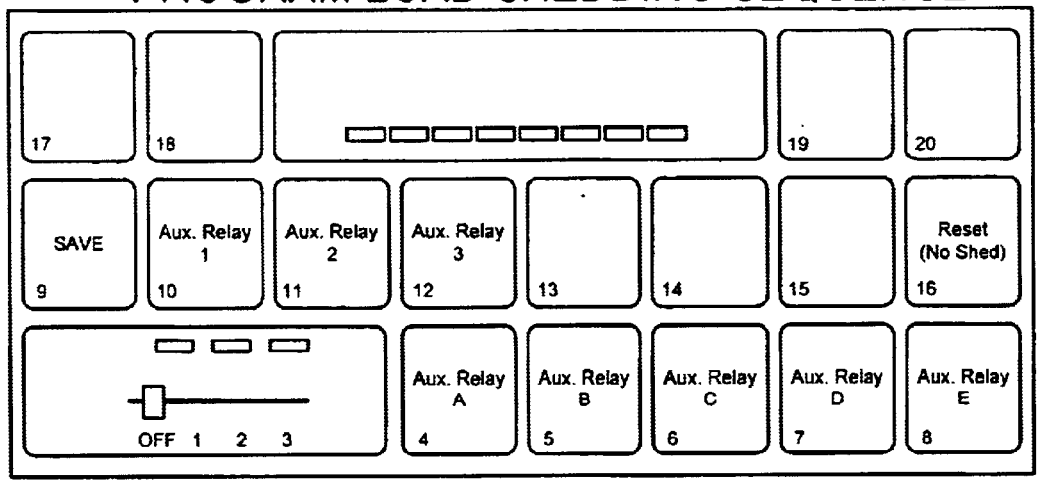

Keys, 4, 5, 6, 7, 8 10, 11 and 12 are illuminated in FIG. 7C and they correspond to relays A, B, C, D, E, 1, 2 and 3, respectively. Of course, there can be any number of relays, and corresponding illuminated keys, subject to the load manager. In a preferred embodiment, only those identified in the load shedding sequence will be shed by the manager if the battery voltage falls below the threshold level.

While the control head 25 is in the programming mode illustrated in FIG. 7C, sequential keystrokes to the keys 4, 5, 6, 7, 8, 10, 11 and 12 are preferably interpreted as the sequence in which the loads are to be shed. For example, keystrokes in the sequence of keys 4, 5, 6 and 8 causes the sequence of load shedding to be relays A, B, C and E. The loads corresponding to the rest of the relays will not be shed during load management.

Also in the programming mode of FIG. 7C, key 16 resets the shed sequence to a default of null. That is, during operation the status of all relay outputs will now be maintained regardless of the condition of the battery voltage. After a load shedding sequence has been entered, a keystroke to key 9 will save the sequence. The control head 25 display then returns to the configuration in FIG. 7B, which will indicate to the user that the sequence has been accepted.

Figure 7D:
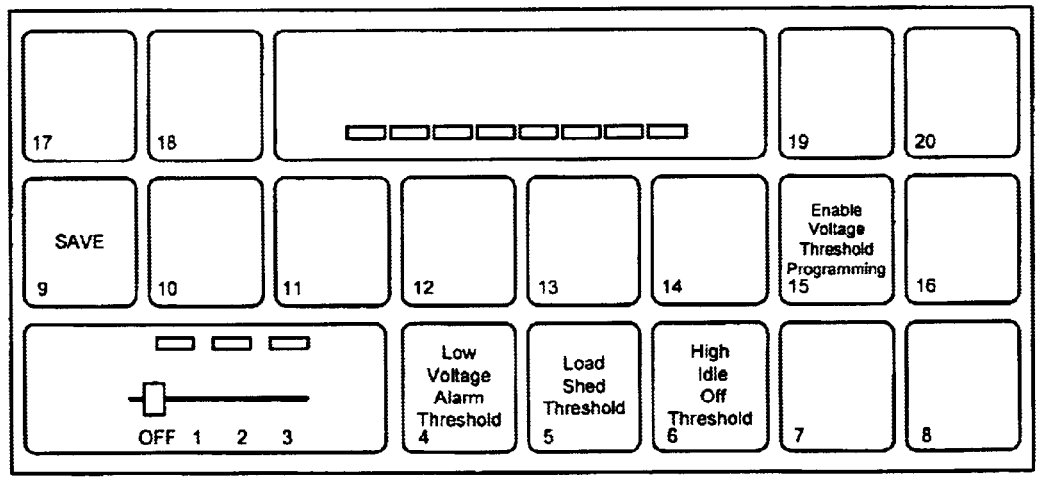

From the state of the control head 25 shown in FIG. 7B, a keystroke to the key 11 causes the system to enter the programming or configuration mode for the voltage thresholds for load shedding, and causes the control head 25 to change the display to that illustrated in FIG. 7D.

The High Idle Control Voltage Threshold, Load Shedding Voltage Threshold, and Low Battery Voltage Alarm Voltage Threshold are programmable as follows: The voltage thresholds are set to some default settings during manufacturing. The voltage threshold programming can be performed only when key 15 in FIG. 7D is pressed and the LED of key 15 turns on. To perform the voltage threshold programming, an adjustable DC power supply and a voltmeter replace the battery 43. All switches are left off and the output of the DC power supply is adjusted to 14 volts. All of these adaptations should be done before enter the programming mode to adjust the voltage thresholds.

At this point, the power supply may be adjusted to 11.8 volts or any other desired voltage. A keystroke to key 4 then reads the voltage into the system memory as the voltage threshold for detecting a "low alarm" condition. Next, the variable source is adjusted to 12.8 volts or any other desired voltage. A keystroke to the key 5 causes the voltage to be read into system memory as the voltage to trigger the load shedding sequence. For the third threshold voltage, the variable voltage source is adjusted to 13.8 volt or any other desired voltage. A keystroke to the key 6 causes the voltage to be read into system memory as the voltage threshold for triggering the disabling of the high idle signal. A keystroke to key 9 after the voltage thresholds have been set will return the system to the state displayed in FIG. 7B.

In the programming mode and with the control head 25 in the state shown in FIG. 7B, keystrokes to key 15 toggles the high idle control between enabled and disabled conditions. The high idle control operates in conjunction with the PARK input. If the vehicle is shifted out of PARK, the high idle control will not turn on. The key 15 is preferably illuminated when the high idle control is enabled and off when high idle control is disabled.

From the menu presented in FIG. 7B, a keystroke to key 16 "Low Voltage Alarm Enable" enables/disables the Low Voltage Alarm. The Low Voltage Alarm turns on if the system senses that the battery voltage is below the low voltage threshold for 30 seconds or more. The LED for key 16 is preferably on when the Low Voltage Alarm is enabled and off when the Low Voltage Alarm is disabled.

A keystroke to key 9 exits the configuration mode for programming the load manager and returns the keypad to the condition illustrated in FIG. 7A. Another keystroke to key 9 will cause the system to exit the program mode and save the new settings.

From the foregoing, it will be appreciated that a programmable integrated load management and emergency signaling system has been described. Parameters of the load shedding system such as voltages, sequence and timing of load shedding can be programmed by way of keystrokes to the keypad 35 after the system has been installed. Using the same keypad, the parameters of emergency signaling devices such as sirens may also be configured. In this regard, the entire signaling system and load management functionality can be controlled from the keypad 35 without necessitating any disassembly of the system, and without requiring an operator to locate and use different user inputs for the various functions.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment can be modified in arrangement and detail without departing from the spirit of the invention. Therefore, the invention as described herein contemplates all such embodiments as may come within the scope of the following claims and equivalents thereof.

We claim:

1. A programmable siren control system for maintaining a charged state in an energy source of an emergency vehicle comprising: a control module for generating siren signals and providing them to a siren that broadcasts an audible emergency signal of a type that is determined by the nature of the siren signals from the module; a switch responsive to the module for selectively controlling the application of the energy source to an auxiliary device that broadcasts emergency signals in response to the application of the energy source to the device; said control module including an integral load manager within the control module for controlling the switch in response to an electrical attribute of the energy source.

2. The control system according to claim 1, wherein the load manager is user programmable, and wherein the nature of the generated signals provided to the siren is user-programmable.

3. The control system according to claim 2 wherein the auxiliary device comprises a light fixture exposed to the exterior of an emergency vehicle.

4. The control system according to claim 2 further comprising an electronic memory associated with the load manager, communicatively coupled to a control head having thereon an array of user-selectable inputs, wherein the electronic memory contains a user-programmable indication related to the auxiliary device such that the controlling of the switch occurs in accordance with the indication related to the auxiliary device.

5. The control system according to claim 4 wherein the electronic memory further contains a user-programmable indication of a load voltage threshold, such that the controlling of the switch further occurs in accordance with a comparison of the load voltage threshold and the voltage of the energy source.

6. The control system according to claim 5, wherein the array of user-selectable inputs on the control head further comprises a user-selectable override input, such that if the user-selectable override input is activated by the user, the controlling of the switch occurs in accordance with activation of the user-selectable override input without regard to the indication related to the auxiliary device, or the comparison of the load voltage threshold and the voltage of the energy source.

7. The control system according to claim 5, wherein the load manager is further communicatively couplable to a vehicle high idle control and a vehicle gear train indicator, and wherein the electronic memory further contains a user-programmable high idle voltage threshold, such that if the vehicle gear train indicator indicates that the vehicle is in a park gear, the load manager controls the vehicle high idle control responsive to a comparison of the high idle voltage threshold and the voltage of the energy source.

8. The control system according to claim 7, wherein the electronic memory further contains a high idle disable indication, such that if the high idle disable indication is set to a predetermined value, the vehicle high idle control is controlled responsive to the high idle disable indication without regard to the comparison of the high idle voltage threshold and the voltage of the energy source.

9. The control system according to claim 4, wherein the electronic memory further contains a user-programmable indication of an alarm voltage threshold, such that an audible alarm is activated responsive to a comparison of the alarm voltage threshold and the voltage of the energy source.

10. The control system according to claim 9, wherein the electronic memory further contains a user-programmable alarm enablement indication, such that if the alarm enablement indication is set to a predetermined value, the audible alarm is activated responsive to the alarm enablement indication without regard to the comparison of the alarm voltage threshold and the voltage of the energy source.

11. The control system according to claim 9, wherein the load manager is further couplable to a vehicle gear train indicator and the siren, and the electronic memory further contains an indication of the state of the gear train and an indication of the state of the siren, such that if the gear train is not in a park condition and the siren is not in an on state, the audible alarm is activated by the load manager responsive to a comparison of the alarm voltage threshold and the voltage of the energy source.

12. A programmable emergency signaling control system for maintaining the supply voltage of an emergency vehicle battery comprising:

a control module electrically connectable to a siren, an external load device, and the battery, and having physically therein an integral siren control and an integral load manager; and a control head communicatively coupled to the control module, and having disposed thereon an array of user-selectable inputs, through the manipulation of which a user may program the siren operation and a voltage-based enabling of the external load by the load manager responsive to the supply voltage.

13. The control system according to claim 12, wherein the control module further comprises an electronic memory communicably linked to the load manager, and having therein a first, second, and third user-programmable voltage thresholds, and a voltage comparator, and wherein the load manager further comprises:

a first output communicably linked to an engine high idle control for supplying an engine high idle enabling signal based on a comparison of the first user-programmable voltage threshold and the supply voltage;

a second output communicably linked to an audible alarm for supplying an alarm enabling signal based on a comparison of the second user-programmable voltage threshold and the supply voltage; and a third output from a relay linked to the external load device for supplying a load enabling signal based on a comparison of the third user-programmable voltage threshold and the supply voltage.

* * * * *